_United States Patent_ [19]

Platt

[11] 4,368,625

[45] Jan. 18, 1983

[54] REFRIGERATION APPARATUS HAVING ITEM THAWING MEANS

[75] Inventor: Clark I. Platt, St. Joseph Township, Berrien County, Mich.

[73] Assignee: Whirlpool Corporation, Benton Harbor, Mich.

[21] Appl. No.: 299,035

[22] Filed: Sep. 3, 1981

[51] Int. Cl.³ ............................................ F25D 25/00
[52] U.S. Cl. ...................................... 62/378; 62/441; 221/150 R; 312/45
[58] Field of Search ................ 62/265, 266, 378, 382, 62/441; 312/36, 45; 221/150 A, 150 R

[56] References Cited

U.S. PATENT DOCUMENTS 2,671,001 3/1954 Ossanna, Jr. ........................ 312/36
2,826,471 3/1958 Fonda .................................. 312/36
2,903,315 9/1959 Schory et al. ..................... 312/214

_Primary Examiner_—Lloyd L. King
_Attorney, Agent, or Firm_—Wegner, McCord, Wood & Dalton

[57] ABSTRACT

A refrigeration apparatus having item thawing means wherein items normally stored in a freezer compartment of the apparatus are automatically transferred to an above-freezing temperature refrigerator compartment seriatim for dispensing thereof in a thawed condition. In the illustrated embodiment, the items are food items. The food items are stored in a rack within the freezer compartment and are dispensed through an opening in the wall between the freezer and refrigerator compartments automatically as a result of the removal of a food item previously delivered to the refrigerator compartment for thawing therein. The automatic movement of the food items is effected by gravity. Structure is provided for cooperating with the food items in the communicating passage for effectively closing the passage against airflow between the compartments.

22 Claims, 3 Drawing Figures

U.S. Patent  Jan. 18, 1983  4,368,625
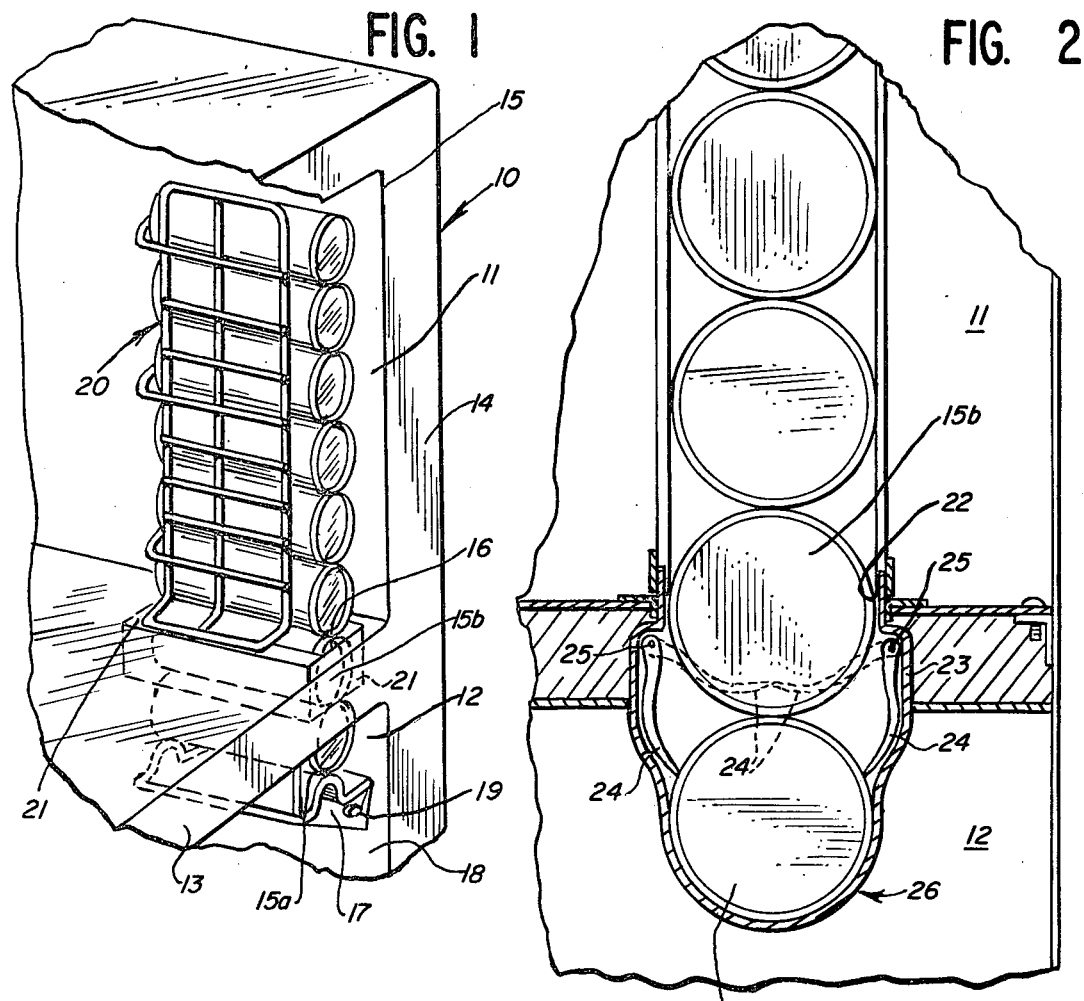
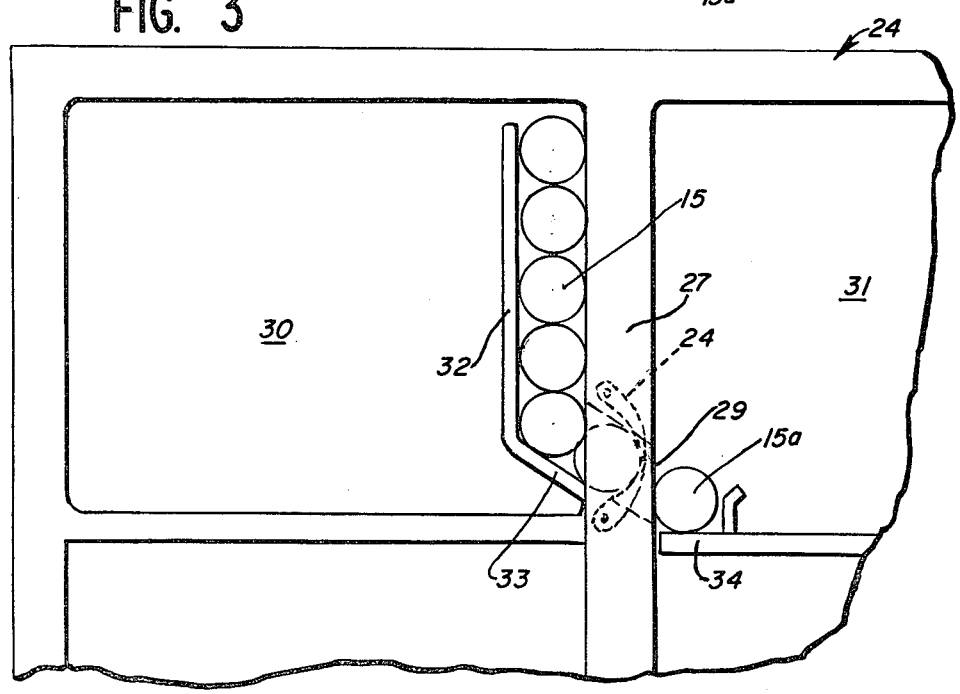

REFRIGERATION APPARATUS HAVING ITEM THAWING MEANS

BACKGROUND OF THE INVENTION

1. Field of the Invention

This invention relates to refrigeration apparatus and in particular to means for automatically thawing and dispensing food items normally stored in a freezing compartment of the refrigeration apparatus by transferring the food items seriatim to an above-freezing refrigerator compartment.

2. Description of the Background Art

In U.S. Pat. No. 3,710,978 of Algar H. Cosby, a dispensing cabinet is shown having an article chute from which cans or the like are dispensed from a gravity-fed stack thereof. The lower end of the cabinet defines a dispensing mouth. The cabinet includes a vertical wall at the rear of the stack. A heating unit in the form of a light bulb is provided at the bottom of the cabinet, with the heated air being conducted upwardly between the divider wall and the rear wall of the cabinet so that the containers forwardly of the wall are progressively heated to higher temperature as they pass down the chute defined by the divider wall and the front wall of the cabinet.

Reinhold A. Johnson et al disclose, in U.S. Pat. No. 4,051,772, a machine for dispensing heated sausages from a cold storage compartment. The conveying mechanism includes two superposed rollers which are rotated step by step about vertically spaced horizontal axes in a vertical portion of the chute. Each of the rollers is provided with a peripheral recess to receive one sausage with the top roller sealing the chute and segregating one sausage which it drops into the recess of the bottom roller. The sausage in the bottom roller is then exposed to heating means while the roller is rotated so as to eventually drop the heated sausage into a dispensing chute below the lower roller.

Another form of vertical chute means for dispensing seriatim cans of food items, such as frozen fruit juice, is illustrated in U.S. Pat. No. 2,826,471 of Allen B. Fonda. The can holding receptacle is mounted to the door of the refrigerator and defines a lowermost access opening permitting the user to remove the lowermost can of fruit juice from the chute with the remaining cans moving downwardly by gravity to expose the newly lowermost can for subsequent dispensing. The dispensing means is shown as being mounted on the freezer door of the refrigerator apparatus so as to maintain the juice in the cans frozen at all times.

SUMMARY OF THE INVENTION

The present invention comprehends an improved food item thawing and dispensing means wherein food items normally stored in the freezer compartment of a refrigeration apparatus are automatically transferred to an above-freezing temperature refrigerator compartment thereof wherein the transferred food items are thawed prior to the use thereof.

The items are transferred through a passage provided in a dividing wall between the freezer and refrigerator compartments of the refrigeration apparatus.

The invention comprehends providing means for sealing the passage against airflow therethrough, thereby effectively maintaining the desired freezing temperature in the freezer compartment and the above-freezing temperature in the refrigerator compartment, notwithstanding the provision of the transfer passage therebetween.

More specifically, the invention comprehends the provision in a refrigeration apparatus having means defining a freezer compartment refrigerated to a below-freezing temperature, a refrigerator compartment refrigerated to an above-freezing low temperature, and an insulated wall separating the compartments, of means for thawing food items normally stored at below-freezing temperatures in the below-freezing compartment prior to removal thereof from the apparatus for use at above-freezing temperatures, including passage means defining a passage through the insulated wall for passing the food items seriatim therethrough, storage means in the freezer compartment and having a lower end opening into the passage means, the storage means being arranged to hold a plurality of the food items for gravitational movement downwardly toward the lower end, and receiving means exposed to the above-freezing temperature of the refrigerator compartment at the passage means and including means for receiving and retaining for user access at least one of the food items delivered to the passage means to be thawed by the exposure thereof to the above-freezing temperature, the remaining food items in the storage means being releasably retained against downwardly gravitational movement by the at least one food item retained by the receiving means, the removal of a food item from the receiving means by the user permitting gravitational downward movement of a food item from those stored in the storage means for automatic replacement of the removed food item in the receiving means.

In the illustrated embodiment, the refrigeration apparatus is provided with sealing means for releasably engaging at least one food item at the passage to define therewith a closure means extending across the passage effectively blocking air movement through the passage.

In broadest aspect, the sealing means comprises suitable air flow control means for causing the passage to be effectively blocked against air movement therethrough.

In the illustrated embodiment, the storage means comprises an open rack disposed in the freezer compartment.

The air flow control means may comprise resilient pad means engaging a food item in the passage.

Alternatively, the air flow control means may comprise closure means releasably engaging a food item in the passage.

The closure means may be arranged to close the passage in the absence of any food item in the passage.

The refrigeration apparatus food item thawing means of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawings wherein:

FIG. 1 is a fragmentary perspective view of a refrigeration apparatus having a new and improved dispensing and thawing means embodying the invention;

FIG. 2 is a fragmentary enlarged vertical section of a modified form of dispensing and thawing means embodying the invention; and FIG. 3 is a fragmentary vertical section of a refrigeration apparatus having another form of thawing dispensing means embodying the invention.

DESCRIPTION OF THE PREFERRED EMBODIMENTS

In the illustrative embodiment of the invention as disclosed in FIG. 1 of the drawing, a refrigeration apparatus generally designated 10 is shown to comprise a conventional dual compartment refrigeration apparatus having a freezer compartment 11 and a refrigerator compartment 12 separated by an insulating dividing wall 13 of the cabinet portion 14 of the apparatus. The freezer compartment is refrigerated by conventional refrigeration apparatus (not shown) to a below-freezing temperature and the refrigerator compartment is refrigerated by the refrigeration apparatus to an above-freezing refrigeration temperature in the normal manner. The present invention is concerned with the automatic transfer of food items, such as frozen juice cans 15, from the freezer compartment to the refrigerator compartment wherein one or more of the food items may be temporarily stored to be thawed therein prior to the removal and use thereof. Thus, the invention provides to the user thawed food items which are normally maintained in frozen condition in the freezer compartment obviating the need for the user to effect a thawing of the food items after removing them from the freezer compartment, as in the conventional prior art structures.

The food items are dispensed downwardly through an opening 16 in the dividing wall 13 onto a receiving means 17 comprising a support spaced below dividing wall 13 and secured to the inner liner 18 of the cabinet by suitable means, such as screws 19.

As shown in FIG. 1, the lowermost can 15a is removably supported on the receiving means 17 immediately below opening 16 so as to retain the next lowermost can 15b in the opening 16. The remaining cans are maintained in a vertical stack by a suitable storage means generally designated 20 comprising a wire rack disposed within the freezer compartment 11 for retaining the cans adjacent the cabinet liner wall in vertical alignment with the opening 16.

As opening 16 defines a passage communicating between the freezer compartment 11 and refrigerator compartment 12, air flow may occur through the passage notwithstanding the presence of the can 15b in the passage. The invention comprehends the provision of means within the passage 16 for blocking such air flow. In the embodiment of FIG. 1, the blocking means comprises compressible pads 21 bonded to the dividing wall 13 at opposite sides of the passage so as to effectively define a resilient inner passage surface for releasably engaging the can 15b in the passage cooperating therewith in effectively closing or blocking the passage against air flow and heat transfer between the two refrigeration apparatus compartments. Preferably, the distance between the oppositely positioned pads 21 is made slightly smaller than the outer diameter of the cans that pass therethrough. The pads 21 may, illustratively, comprise resilient foam pads formed of a suitable synthetic resin and having a low thermal conductivity.

Thus, the invention comprehends the provision of means for cooperating with one or more of the food items 15 at the communicating passage 16 for blocking air flow between the two compartments, thereby maintaining the desired below-freezing temperature in compartment 11, and above-freezing temperature in compartment 12, notwithstanding the provision of the passage means 16.

Another form of air flow blocking means is illustrated in the embodiment of FIG. 2 wherein the passage 22 is defined by wall means 23. A pair of opposed closure elements 24 are pivotally mounted within recesses at opposite sides of the wall means 23 by suitable spring-biased pivots 25 urging the closure elements 24 to a position extending across the passage 22. Thus, as shown in FIG. 2, the closure elements 24 cooperate with the can 15b in passage 22 for effectively blocking air flow through the passage when a can 15b is disposed therein.

As further illustrated in broken lines in FIG. 2, the closure elements are pivoted into engagement with each other when no can is present in the passage 22 so as to define a closure means at that time, as well as means for cooperating with a can in the passage for closing the passage, as discussed above.

In the embodiment of FIG. 2, a modified form of receiving means generally designated 26 is illustrated wherein the lowermost can is supported by a bottom portion of the wall means 23 so as to permit removal of the thawed lowermost can 15a endwise from the supporting wall portion 23.

The invention further comprehends that the passage for the food items be provided in the vertical dividing wall 27 of a side-by-side freezer-refrigerator apparatus, such as apparatus 28 illustrated in FIG. 3. Thus, as shown in FIG. 3, the passage 29 may comprise a passage angled to the vertical opening through the vertical divider wall 27 between the freezer compartment 30 and the above-freezing temperature refrigerator compartment 31. The rack 32 may be provided with an angled lower portion 33 for guiding the lowermost cans 15 downwardly through the passage 29 to provide the lowermost can 15a on a support 34 in the refrigerator compartment 31. As shown in FIG. 3, the stack of food items may be retained between the divider wall 27 and rack 32 whereby the divider wall cooperates with the rack in defining the guide chute for the gravitational feed of the cans 15.

In the illustrated embodiment of FIG. 3, the air flow blocking means may comprise closure members 24, as illustrated in the embodiment of FIG. 2.

The storage means is illustrated as comprising a wire rack. It is desirable to provide the storage means in the form of such a rack or otherwise perforated or open structure for facilitated contact of the freezer air with the items carried thereby.

As shown in the illustrated embodiments, the passage means openings are sized to be only slightly larger than the food items to be dispensed therethrough so as to facilitate the air blocking functioning of the apparatus.

As the delivery of the food items is effected automatically by gravity, the transfer structure requires no energy input, while yet providing the highly desirable automatic transfer of the food items seriatim into thawing position in the refrigeration compartment.

The passage means effectively defines a continuation of the rack and, as will be obvious to those skilled in the art, the entire structure of the rack, passage, passage defining means, and retaining means in the refrigeration compartment may be formed as an integral unit suitably installed in an opening in the divider wall as desired.

The foregoing disclosure of specific embodiments is illustrative of the broad inventive concepts comprehended by the invention.

Having described the invention, the embodiments of the invention in which an exclusive property or privilege is claimed are defined as follows:

1. In a refrigeration apparatus having means defining a freezer compartment refrigerated to a below-freezing temperature, a refrigerator compartment refrigerated to an above-freezing temperature, and an insulated wall separating said compartments, means for thawing food items normally stored at below-freezing temperatures in said below-freezing compartment prior to removal thereof from said apparatus for use at above-freezing temperatures, said thawing means comprising:

passage means defining a passage through said insulated wall for passing said food items seriatim therethrough;

storage means in said freezer compartment and having a lower end opening into said passage means, said storage means being arranged to hold a plurality of said food items for gravitational movement downwardly toward said lower end; and receiving means adjacent said passage means and exposed to the above-freezing temperature of the refrigerator compartment, including means for receiving and retaining for user access at least one of said food items delivered to said passage means to be thawed by the exposure thereof to said above-freezing temperature, the remaining food items in said storage means being releasably retained against downward gravitational movement by said at least one food item retained by said receiving means, the removal of a food item from said receiving means by the user permitting gravitational downward movement of a food item from those stored in said storage means for automatic replacement of the removed food item in said receiving means.

2. The refrigeration apparatus of claim 1 wherein said storage means comprises an open support providing substantial exposure of the food item stored therein directly to the below-freezing temperature air of the freezer compartment.

3. The refrigeration apparatus of claim 1 wherein said storage means comprises an open rack.

4. The refrigeration apparatus of claim 1 wherein said passage means is arranged to be effectively blocked against air movement therethrough by at least one of said food items to be dispensed.

5. The refrigeration apparatus of claim 1 wherein said storage means is arranged to store the food items in vertically stacked association.

6. In a refrigeration apparatus having means defining a freezer compartment refrigerated to a below-freezing temperature, a refrigerator compartment refrigerated to an above-freezing temperature, and an insulated wall separating said compartments, means for thawing food items normally stored at below-freezing temperatures in said below-freezing compartment prior to removal thereof from said apparatus for use at above-freezing temperatures, said thawing means comprising:

passage means defining a passage through said insulated wall for passing said food items seriatim therethrough;

storage means in said freezer compartment and having a lower end opening into said passage means, said storage means being arranged to hold a plurality of said food items for gravitational movement downwardly toward said lower end;

receiving means adjacent said passage means and exposed to the above-freezing temperature of the refrigerator compartment, including means for receiving and retaining for user access at least one of said food items delivered to said passage means to be thawed by the exposure thereof to said above-freezing temperature, the remaining food items in said storage means being releasably retained against downward gravitational movement by said at least one food item retained by said receiving means, the removal of a food item from said receiving means by the user permitting gravitational downward movement of a food item from those stored in said storage means for automatic replacement of the removed food item in said receiving means; and sealing means for releasably engaging at least one food item at said passage to define therewith a closure means extending across said passage effectively blocking air movement through said passage.

7. The refrigeration apparatus of claim 6 wherein said sealing means is mounted to said passage means.

8. The refrigeration apparatus of claim 6 wherein said sealing means is disposed within said passage.

9. The refrigeration apparatus of claim 6 wherein said said sealing means comprises means resiliently biased to engage said at least one food item within said passage.

10. The refrigeration apparatus of claim 6 wherein said sealing means comprises resiliently compressible foam pad.

11. The refrigeration apparatus of claim 6 wherein said sealing means comprises at least one closure element movably mounted within said passage.

12. The refrigeration apparatus of claim 6 wherein said sealing means comprises at least one closure element movably mounted within said passage and resilient means for urging said closure element into engagement with said at least one food item within said passage.

13. In a refrigeration apparatus having means defining a freezer compartment refrigerated to a below-freezing temperature, a refrigerator compartment refrigerated to an above-freezing temperature, and an insulated wall separating said compartments, means for thawing food items normally stored at below-freezing temperatures in said below-freezing compartment prior to removal thereof from said apparatus for use at above-freezing temperatures, said thawing means comprising:

passage means defining a passage through said insulated wall for passing said food items seriatim therethrough;

storage means in said freezer compartment and having a lower end opening into said passage means, said storage means being arranged to hold a plurality of said food items for gravitational movement downwardly toward said lower end;

receiving means adjacent said passage means and exposed to the above-freezing temperature of the refrigerator compartment, including means for receiving and retaining for user access at least one of said food items delivered to said passage means to be thawed by the exposure thereof to said above-freezing temperature, the remaining food items in said storage means being releasably retained against downward gravitational movement by said at least one food item retained by said receiving means, the removal of a food item from said receiving means by the user permitting gravitational downward movement of a food item from those stored in said storage means for automatic replacement of the removed food item in said receiving means; and air flow control means for causing the passage to be effectively blocked against air movement therethrough.

14. The refrigeration apparatus of claim 13 wherein said air flow control means comprises means for selectively extending across the passage for effectively blocking air flow therethrough in the absence of a food item at said passage.

15. The refrigeration apparatus of claim 13 wherein said air flow control means comprises closure means movably mounted to said passage and means for biasing said closure means to extend across said passage for effectively blocking air flow therethrough in the absence of a food item at said passage.

16. The refrigeration apparatus of claim 13 wherein said insulated wall is horizontal and said passage opens vertically therethrough.

17. The refrigeration apparatus of claim 13 wherein said insulated wall is vertical and said passage opens therethrough at an angle to the vertical.

18. In a refrigeration apparatus having means defining a freezer compartment refrigerated to a below-freezing temperature, a refrigerator compartment refigerated to an above-freezing low temperature, and an insulated wall separating said compartments, means for thawing food items normally stored at below freezing temperatures in said below-freezing compartment prior to removal thereof from said apparatus for use at above-freezing temperatures, said thawing means comprising:

passage means defining a passage through said insulated wall for passing said food items seriatim therethrough;

a storage rack in said freezer compartment and having a lower end opening into said passage means, said rack being arranged to hold a plurality of said food items for gravitational movement downwardly toward said lower end;

receiving means disposed in the refrigerator compartment adjacent said passage means and including means for receiving and retaining for user access at least one of said food items delivered to said passage means to be thawed by the exposure thereof to said above-freezing temperature, the remaining food items in said rack being releasably retained against downward gravitational movement by said at least one food item retained by said receiving means, the removal of a food item from said receiving means by the user permitting gravitational downward movement of a food item from those stored in said rack for automatic replacement of the removed food item in said receiving means; and yieldable means engaging a food item in said passage for cooperating therewith to block air flow through said passage.

19. The refrigeration apparatus of claim 18 wherein said yieldable means comprises flap means extending from said passage means into releasable engagement with said food item in the passage.

20. The refrigeration apparatus of claim 19 wherein said passage defines a pair of opposed, facing recesses and said flap means comprises a resilient pivotally mounted flap disposed in each recess and biased outwardly across said passage.

21. The refrigeration apparatus of claim 18 wherein said yieldable means comprises compressible pad means resiliently engaging said food item in the passage.

22. The refrigeration apparatus of claim 21 wherein said pad means effectively defines a resilient inner surface along at least a portion of said passage means.

* * * * *